United States Patent [19]
Glaser

[11] Patent Number: 6,058,264
[45] Date of Patent: *May 2, 2000

[54] EXTENDER SMART GUIDE FOR CREATING AND MODIFYING EXTENDERS

[75] Inventor: Howard Justin Glaser, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/828,897

[22] Filed: Mar. 31, 1997

[51] Int. Cl.$^7$ ............................................. G06F 9/445
[52] U.S. Cl. .................. 395/702; 395/701; 395/703; 395/704; 707/4
[58] Field of Search ..................... 395/701, 702, 395/703, 704; 707/4

[56] References Cited

U.S. PATENT DOCUMENTS

| | | | |
|---|---|---|---|
| 4,831,580 | 5/1989 | Yamada | 345/433 |
| 5,168,441 | 12/1992 | Onarheim et al. | 364/146 |
| 5,179,698 | 1/1993 | Bachman et al. | 707/4 |
| 5,193,182 | 3/1993 | Bachman et al. | 707/100 |
| 5,193,183 | 3/1993 | Bachman | 707/1 |
| 5,195,178 | 3/1993 | Krieger et al. | 345/347 |
| 5,241,645 | 8/1993 | Cimral et al. | 395/500 |
| 5,249,300 | 9/1993 | Bachman et al. | 707/104 |
| 5,301,326 | 4/1994 | Linnett et al. | 395/700 |
| 5,408,667 | 4/1995 | Brodie et al. | 345/700 |
| 5,485,601 | 1/1996 | Ching | 395/500 |
| 5,752,017 | 5/1998 | Bhargava et al. | 395/602 |
| 5,754,858 | 5/1998 | Broman et al. | 395/701 |
| 5,765,147 | 6/1998 | Mattos et al. | 707/4 |
| 5,889,520 | 3/1999 | Glaser | 345/349 |
| 5,892,948 | 4/1999 | Aoki et al. | 395/701 |
| 5,911,070 | 6/1999 | Solton et al. | 395/701 |
| 5,978,582 | 11/1999 | McDonald et al. | 395/702 |

OTHER PUBLICATIONS

Tichy et al., "Using A Program Generator to Implement Persistence Automatically Can Take The Drudgery Out of The Load–Process–Save Model", C + + report, pp. 23–33, Jan. 1994.

Mark Grossman, "Object I/O And Runtime Type Information Via Automatic Code Generation in C + +", pp. 34–42, Aug. 1993.

Ooi et al, Extending A DBMS For Geographic Applications, IEEE, 590–597, May 1989.

Kiernan et al, Compiling a Rule Database Program into a C/SQL Application, IEEE, 388–395, 1991.

Dunlop et al, Providing Access to a Multimedia Archive Using The WWW and an Object–Relational Database Management System, Computing & Control Engineering Journal, 221–226, Aug. 1996.

*Primary Examiner*—Eric W. Stamber
*Assistant Examiner*—Ted T. Vo
*Attorney, Agent, or Firm*—Pretty, Schroeder & Poplawski, P.C.

[57] ABSTRACT

A method, apparatus, and article of manufacture for providing a programming development environment that supports the development of Internet and Intranet applications. In particular, a database extender can be created. Initially, information from a user interface is captured. An intermediate language is then generated corresponding to the captured information. A source code is generated from the generated intermediate language. The source code implements the functionality of the database extender by interfacing to a generic extender. The interfaced generic extender is configured to take on the characteristics of the specific extender defined in the intermediate language. Then, the configured generic extender is executed as configured to access and maintain the relational integrity of the specific extender.

21 Claims, 16 Drawing Sheets

EXTENDER SMART GUIDE FOR CREATING AND MODIFYING EXTENDERS

CROSS-REFERENCE TO RELATED APPLICATIONS

This application is related to the following co-pending and commonly-assigned patent applications:

Application Ser. No. 08/828,854 entitled "PROGRAMMING DEVELOPMENT ENVIRONMENT FOR INTRANET AND INTERNET APPLICATIONS EMPLOYING UNIQUE PROJECT DATA STRUCTURE," filed on same date herewith, by Daniel E. House, Brian J. Owings, and Shiau-Shiau Pei, attorney's docket number ST997027;

Application Ser. No. 08/828,476 entitled "SHARED OBJECT MODEL," filed on same date herewith, by Brian J. Owings, Shiau-Shiau Pei, and Daniel E. House, attorney's is docket number ST997035;

Application Ser. No. 08/828,480 entitled "REMOTE SCRIPTING OF LOCAL OBJECTS," filed on same date herewith, by Daniel E. House, Constance J. Nelin, and Rebecca B. Nin, attorney's docket number ST997020;

Application Ser. No. 08/828,989 entitled "METHOD AND APPARATUS FOR SIMULATING A MULTI-TIERED COMPUTER ENVIRONMENT," filed on same date herewith, by Daniel E. House and Constance J. Nelin, attorney's docket number ST997021;

Application Ser. No. 08/829,478 entitled "MULTI-TIER VIEW PROJECT WINDOW," filed on same date herewith, by Howard J. Glaser, Daniel E. House, and Constance J. Nelin, attorney's docket number ST997022;

Application Ser. No. 08/829,104 entitled "EXTENDER USER INTERFACE," filed on same date herewith, by Thomas E. Conrad, Howard J. Glaser, Jean C. Ho, James L. Keesey, Constance J. Nelin, and Gerold J. Wilmot, attorney's docket number ST997013;

Application Ser. No. 08/828,846 entitled "SHARED MODULES GRAPHICAL USER INTERFACE," filed on same date herewith, by Howard J. Glaser, Daniel E. House, and Constance J. Nelin, attorney's docket number ST997025;

Application Ser. No. 08/828,479 entitled "QUERY SELECTION FOR A PROGRAM DEVELOPMENT ENVIRONMENT," filed on same date herewith, by Howard J. Glaser and Mary C. Lehner, attorney's docket number ST997040;

Application Ser. No. 08/828,477 entitled "DOCKING AND FLOATING MENU/TOOL BAR," filed on same date herewith, by Howard J. Glaser, Stewart E. Nickolas, and Karl D. Johnson, attorney's docket number ST997038;

Application Ser. No. 08/828,890 entitled "HTML INTEGRATION UTILITY FOR A PROGRAM DEVELOPMENT ENVIRONMENT," filed on same date herewith, by Howard J. Glaser, attorney's docket number ST997028;

Application Ser. No. 08/828,481 entitled "MULTI-TIER DEBUGGING," filed on same date herewith, by Daniel E. House and Constance J. Nelin, attorney's docket number ST997036; and Application Ser. No. 08/828,990 entitled "DYNAMIC DISCOVERY OF CONTROLS," filed on same date herewith, by Daniel E. House and Constance J. Nelin, attorney's docket number ST997037;

all of which applications are incorporated by reference herein.

BACKGROUND OF THE INVENTION

1. Field of the Invention

This invention relates in general to programming development environments performed by computers, and in particular, to an extender smart guide.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art for methods of accessing RDBMS software across an Internet or Intranet, and especially via Web-based networks. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method, apparatus, and article of manufacture for providing a programming development environment that supports the development of Internet and Intranet applications.

In particular, a database extender can be created using a smart guide. Initially, information from a user interface is captured. An intermediate language is then generated corresponding to the captured information. A source code is generated from the generated intermediate language. The source code implements the functionality of the database extender by interfacing to a generic extender. The interfaced generic extender is configured to take on the characteristics of the specific extender defined in the intermediate language. Then, the configured generic extender is executed as configured to access and maintain the relational integrity of the specific extender.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
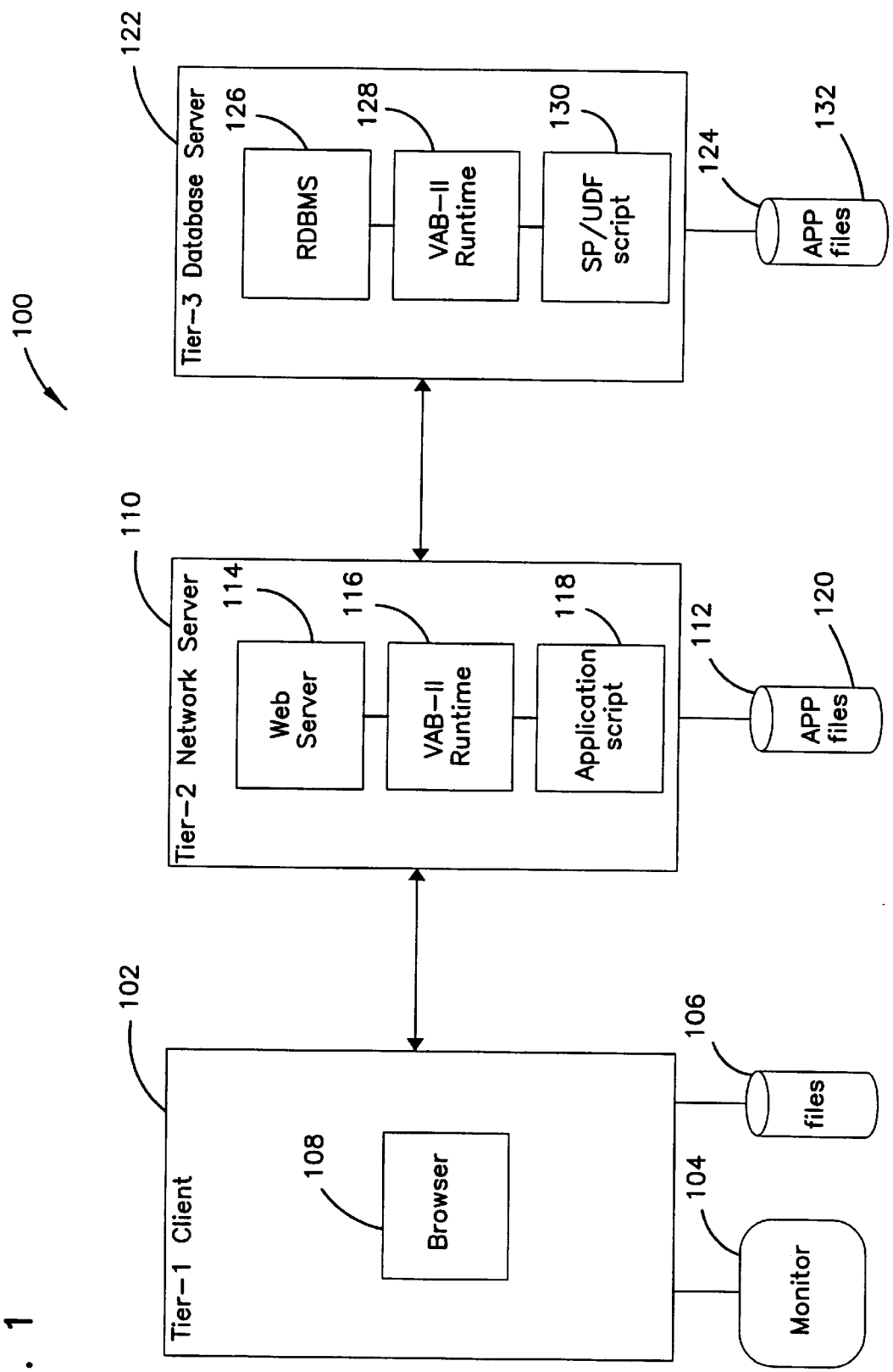
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
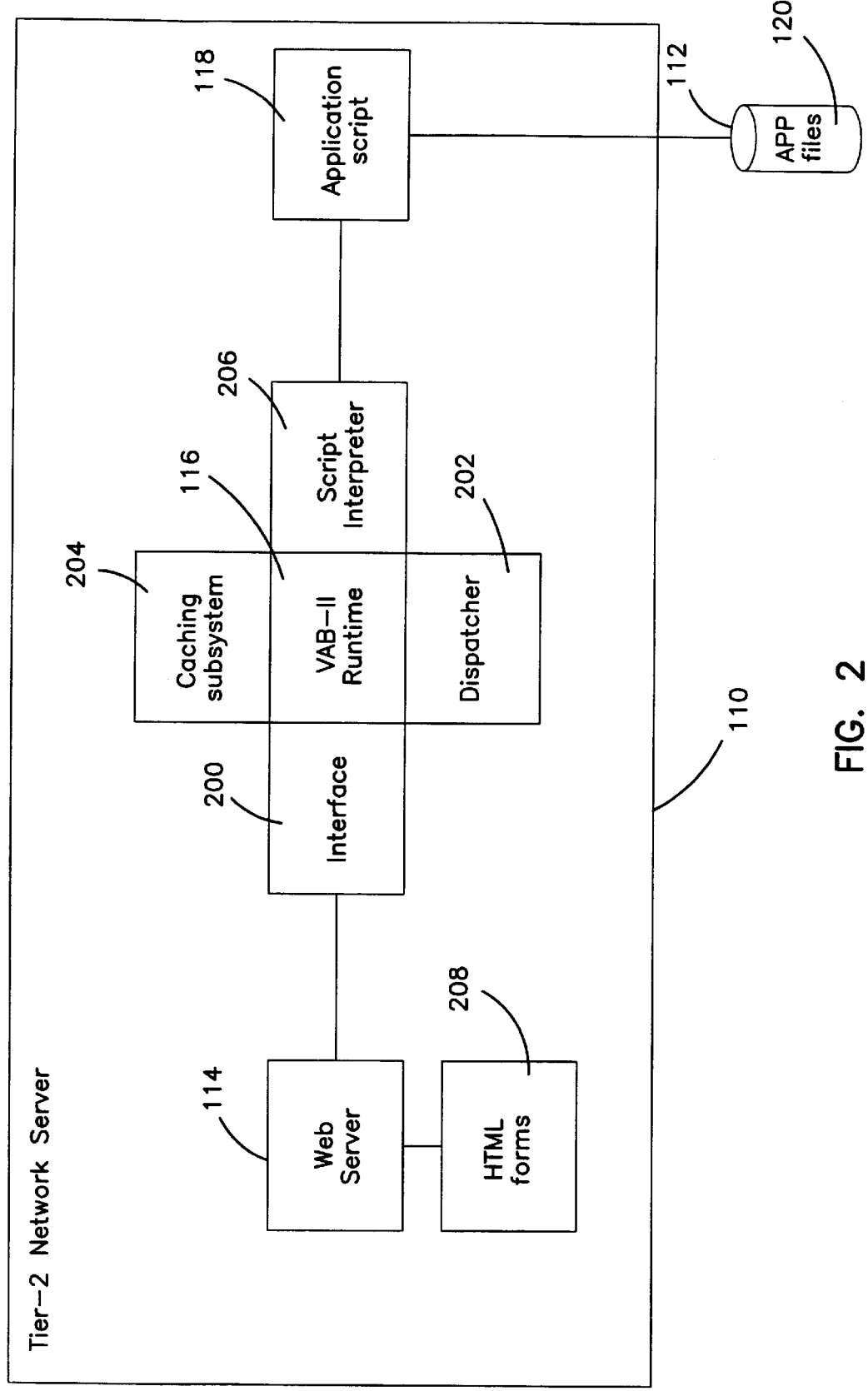
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
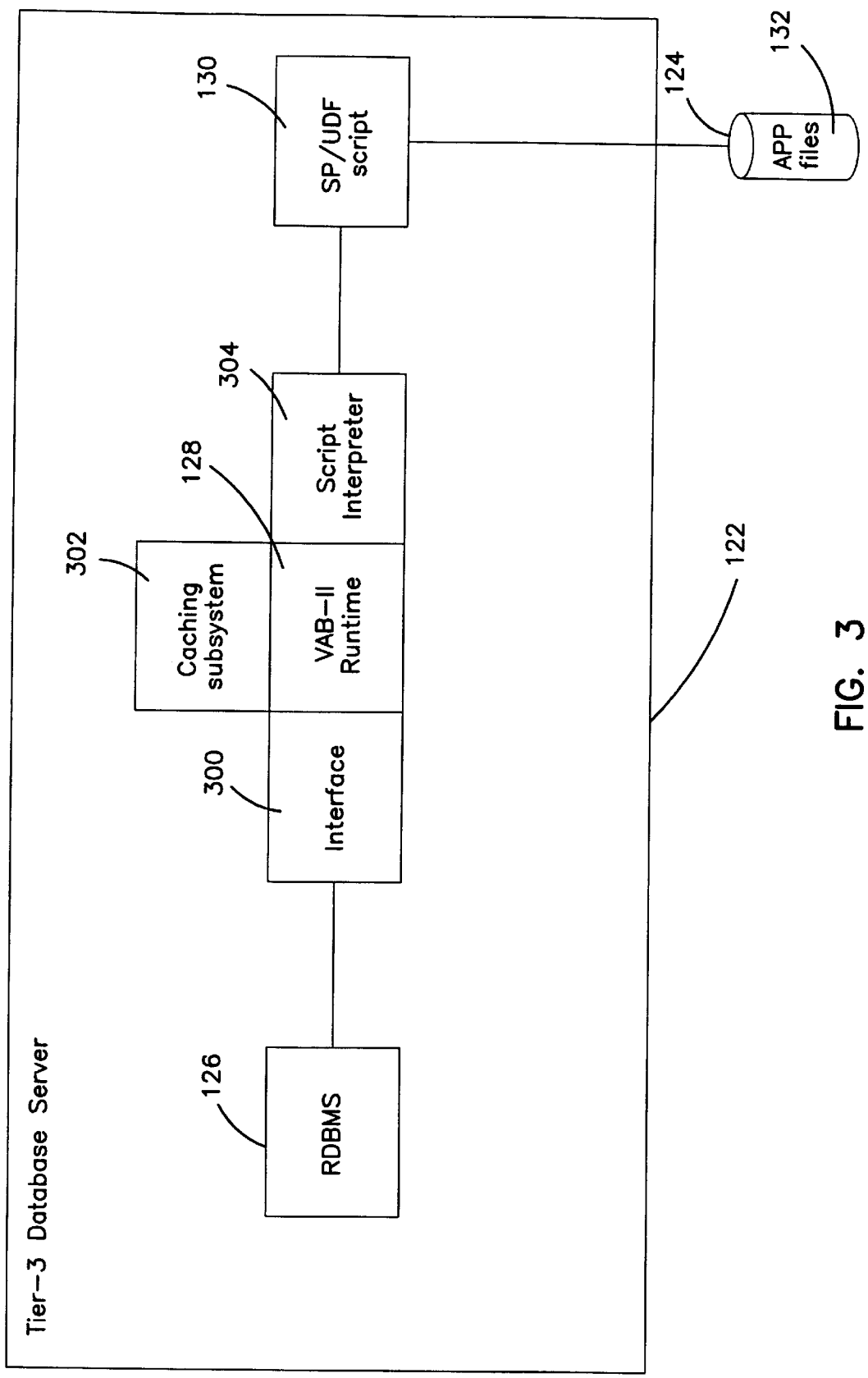
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
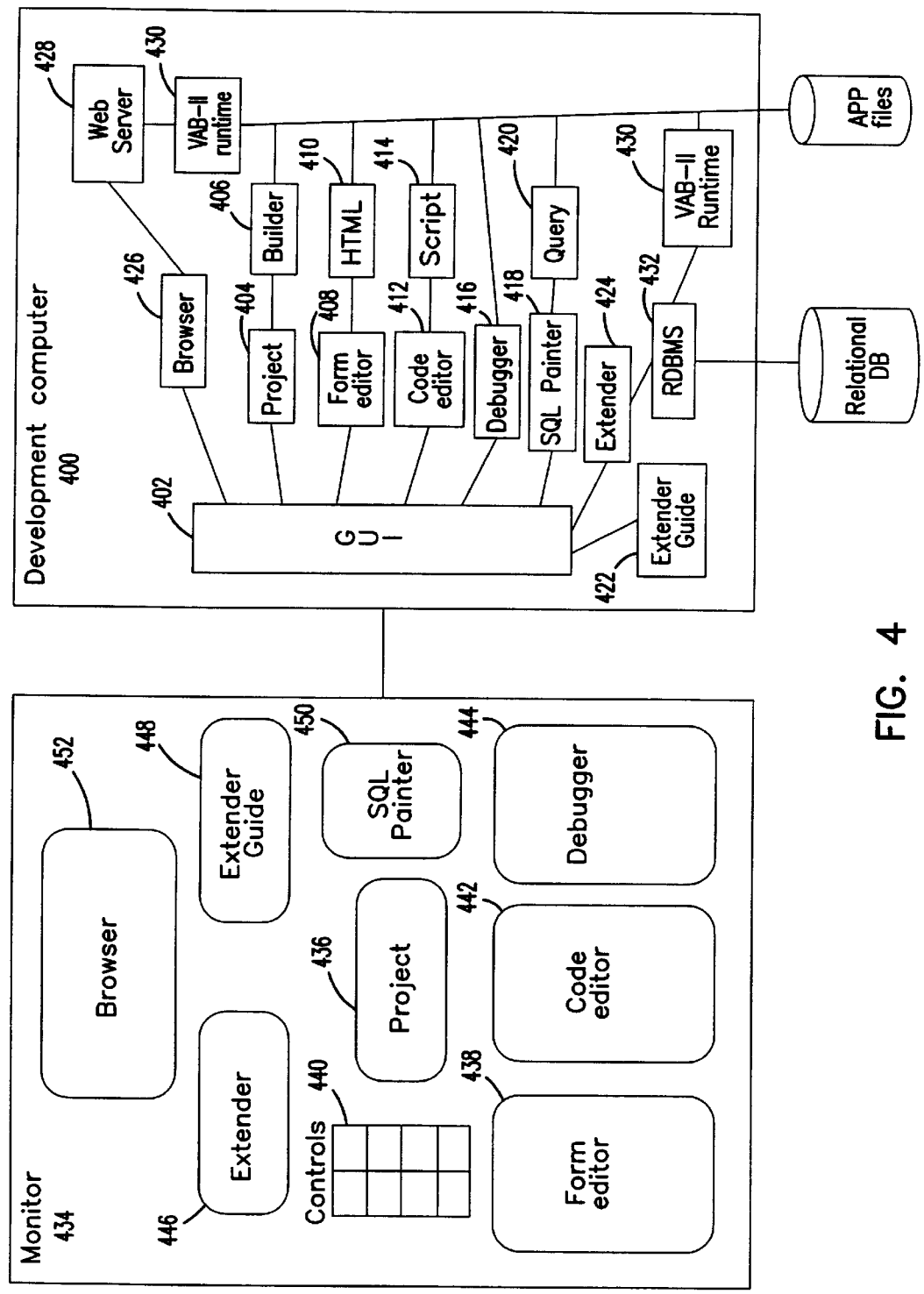
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Extender Smart Guide

RDBMS extenders allow developers to define distinct data types and special functions for many types of non-traditional data. At the highest level, extenders are comprised of a user-defined type (UDT) with one or more user-defined functions (UDFs) which manipulate the UDT, and a set of administrative support tables and triggers which contain meta information about the extender. With the extender approach, complex manipulation of UDTs is implemented once and accessed from many tier-2 applications. This allows quicker development of tier-2 applications and ensures consistency across the applications.

An extender smart guide (or "wizard") 422 is provided by the development environment 400 according to the present invention. The extender smart guide 422 provides a series of "smart guides" or graphical user interfaces 448 for receiving an extender definition (i.e. high level information about the extender) and automatically generates the various programming logic for the extender definition. By providing these smart guides, the extender smart guide 422 allows a developer to build extenders, but the extender smart guide 422 hides the internal mechanisms from the developer.

Flowcharts

Figure 5:
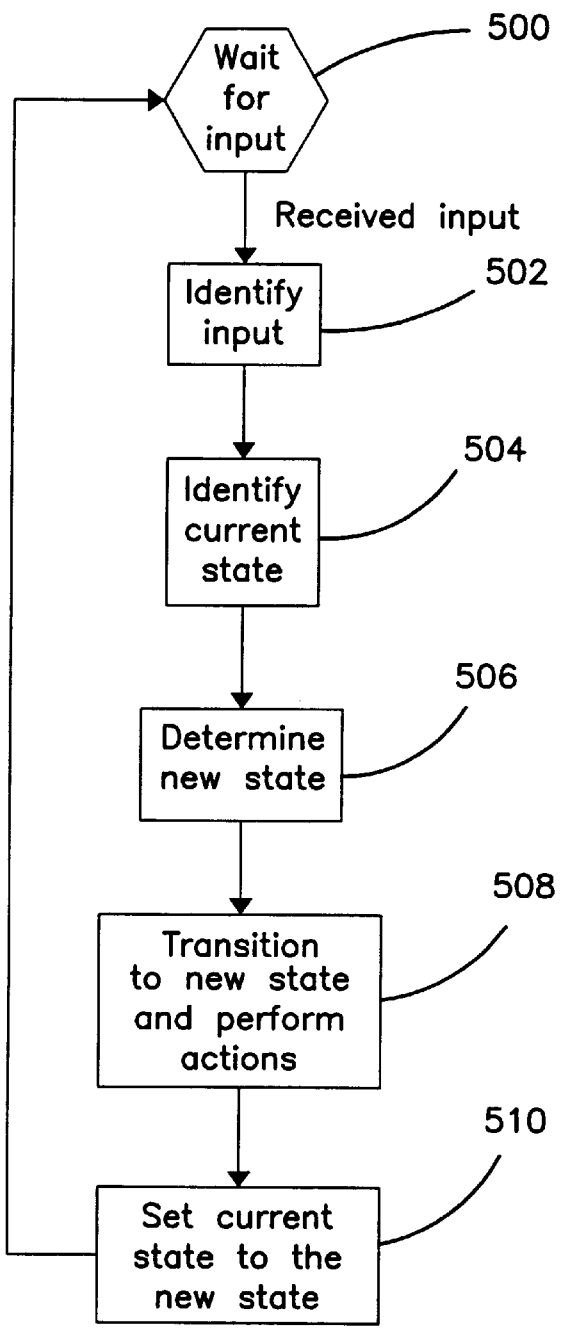
FIG. 5 is a flow chart that illustrates the general logic of the development computer in performing the steps of the present invention, and more specifically, in performing the steps necessary for handling the user interface for the development computer.

FIG. 5 is a flow chart that illustrates the general logic of the development computer 400 in performing the steps of the present invention, and more specifically, in performing the steps necessary for handling the user interface for the development computer 400. In the development computer 400, operations are performed when transitions are made, based upon input events, from present or current states to new states.

Block 500 represents the development computer 400 waiting for an input event (e.g., a mouse button click). It should be appreciated that during this time, other system tasks, e.g., file, memory, and video tasks, etc., may also be carried out. When an input event occurs, control passes to block 502 to identify the input event. Based upon the input event, as well as the current state of the development computer 400 determined in block 504, a new state is determined in block 506. In block 508, a transition is made to the new state and performs any actions required for the transition. In block 510, the current state is set to the previously determined new state, and control returns to block 500 to wait for more input events.

The specific operations that are performed by block 508 when transitioning between states will vary depending upon the current state and the input event. The various operations required to implement the present invention represent particular events handled by the development computer 400. However, it should be appreciated that these events represent merely a subset of all of the events handled by the development computer 400.

Figure 6:
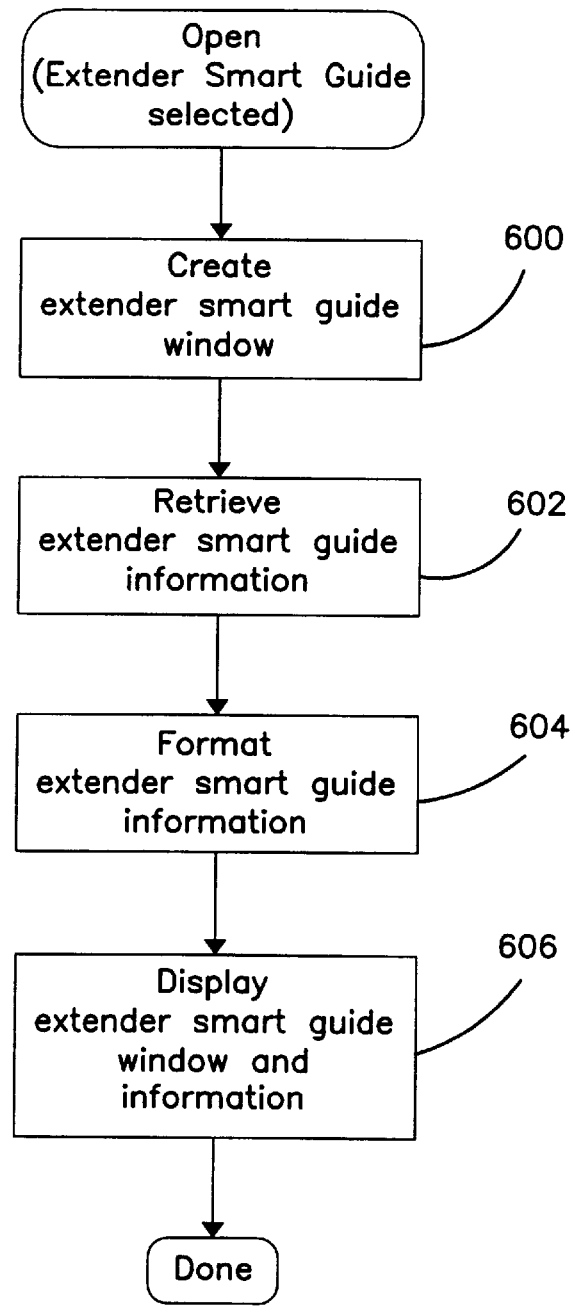
FIG. 6 is a flow chart that illustrates the general logic for an open (extender smart guide selected) routine.

FIG. 6 illustrates operations that may be performed by the development computer 400 when an extender smart guide 422 is selected as part of the preferred embodiment of the invention. In FIG. 6, the header block thereof indicates the particular input event with the current state denoted in parentheses. For FIG. 6, corresponding diagrams, i.e., FIG. 7A–7G, are provided to illustrate the operation of the routine.

FIG. 6 is a flow chart that illustrates the general logic for an open (extender smart guide selected) routine. FIGS. 7A–7G are diagrams of a computer generated display 448 illustrating the operation of the routine of FIG. 6. The open routine opens or creates an extender smart guide window 422 to enable a user to create an extender.

Figure 7A:
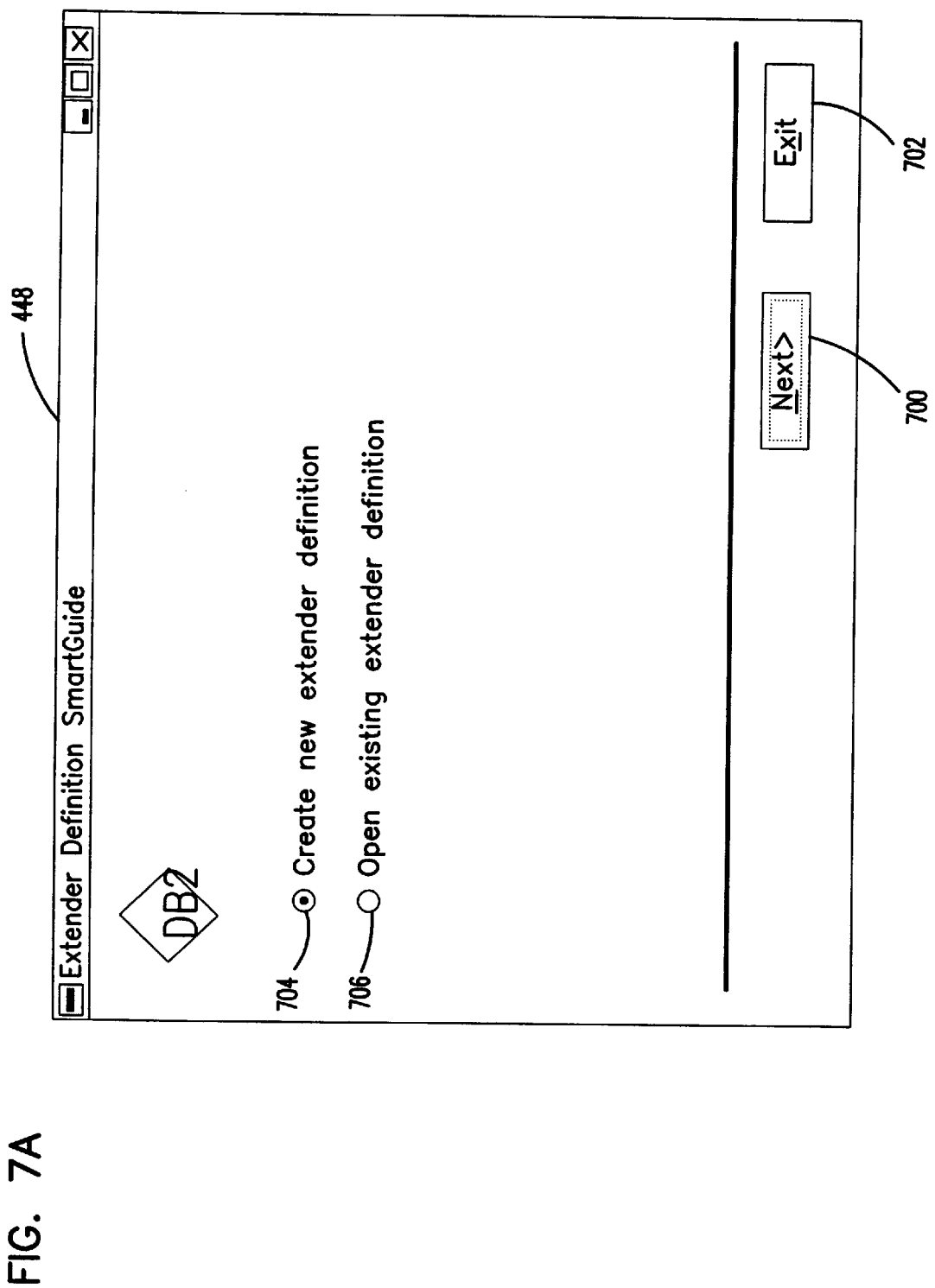
FIGS. 7A–7G are diagrams of a computer generated display illustrating the operation of the general logic for an open (extender smart guide selected routine)

The extender smart guide window 448 is illustrative of a typical graphical user interface (GUI) window, and includes several standard user interface mechanisms, such as that displayed in FIG. 7A, including a title bar (for repositioning), a border (for resizing), a minimize button, a maximize button, and a close button, and may also have scroll bars (for scrolling). Additionally, the user interface 448 contains a next button 700 for advancing to the next smart guide and an exit button 702 for exiting from the extender smart guide window 448. The user interface 448 may also contain a cancel button for returning to a previous smart guide.

In the preferred embodiment, the open routine is executed whenever an "open" event (e.g., a double-clicked mouse button) is recorded after an extender smart guide has been selected. Selection of an extender smart guide may be made in several known manners, e.g., by using various mouse/keyboard combinations to select or highlight the extender smart guide represented visually on monitor 434 of the development computer 400. The act of opening or creating an extender smart guide 422 may be initiated by other functions, e.g., selecting the function in a fixed or pop-up menu.

Block 600 represents the development computer 400 creating the extender smart guide window 448. The extender smart guide window 448 includes typical user interface mechanisms, such as those displayed in FIG. 7A. A contents area is defined within the extender smart guide window 448.

Block 602 represents the development computer 400 retrieving the extender smart guide information from an APP file stored in a data storage device connected (either locally or remotely) to the development computer 400.

Block 604 represents the development computer 400 formatting the retrieved extender smart guide information for display within the contents area of the extender smart guide window 448.

Block 606 represents the development computer 400 displaying the extender smart guide window 448 and the formatted extender smart guide information on a monitor 434, as shown in FIG. 4. Opening or creation of the extender smart guide window 448 is then complete.

Once an extender smart guide window 448 is created and displayed, various operations are preferably provided to manipulate the extender smart guide window 448 and its contents, as is well known in the art.

FIGS. 7A–7G illustrate smart guide windows 448 provided by the extender smart guide 422 to enable a user to create or modify an extender definition. Each of these figures includes standard user interface mechanisms, such as a title bar (for repositioning), a border (for resizing), a minimize button, a maximize button and a close button, and may also have scroll bars (for scrolling). Additionally, each user interface typically contains a next button for advancing to the next smart guide and a cancel button for returning to a previous smart guide or an exit button for exiting from the extender smart guide window 448.

FIG. 7A illustrates the first user interface provided by the extender smart guide 422 and displayed in the extender smart guide window 448. This smart guide provides selection boxes 704 and 706 that enable a user to either create a new extender definition or open an existing extender definition. When selection box 704 is selected, the smart guide window 448 illustrated in FIG. 7B is displayed.

Figure 7B:
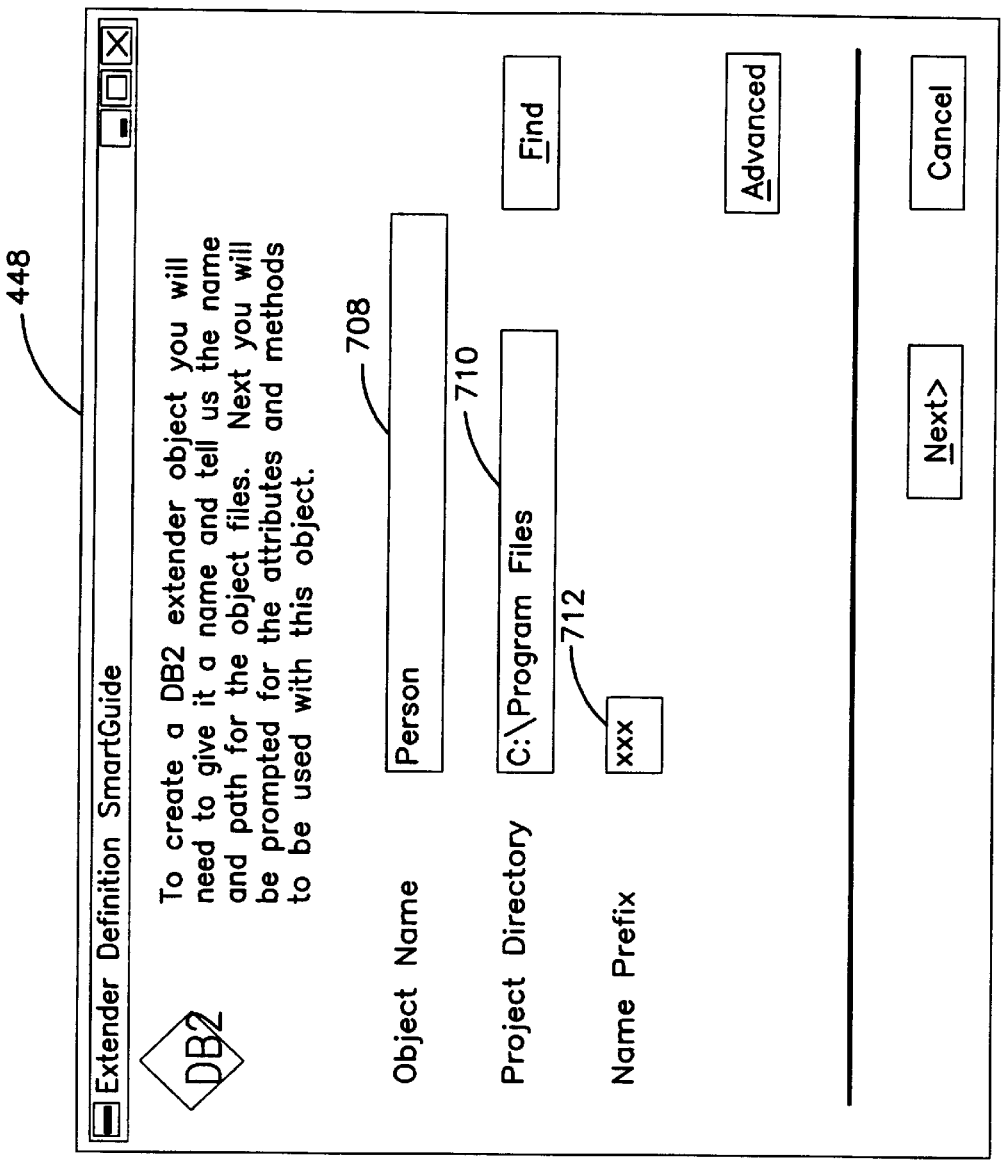

FIG. 7B includes an object name text box 708, a project directory text box 710, and a name prefix text box 712 for obtaining information for the extender to be created. Once this information is entered into text boxes 708, 710, and 712, the next smart guide, illustrated in FIG. 7C, is displayed within the smart guide window 448.

Figure 7C:
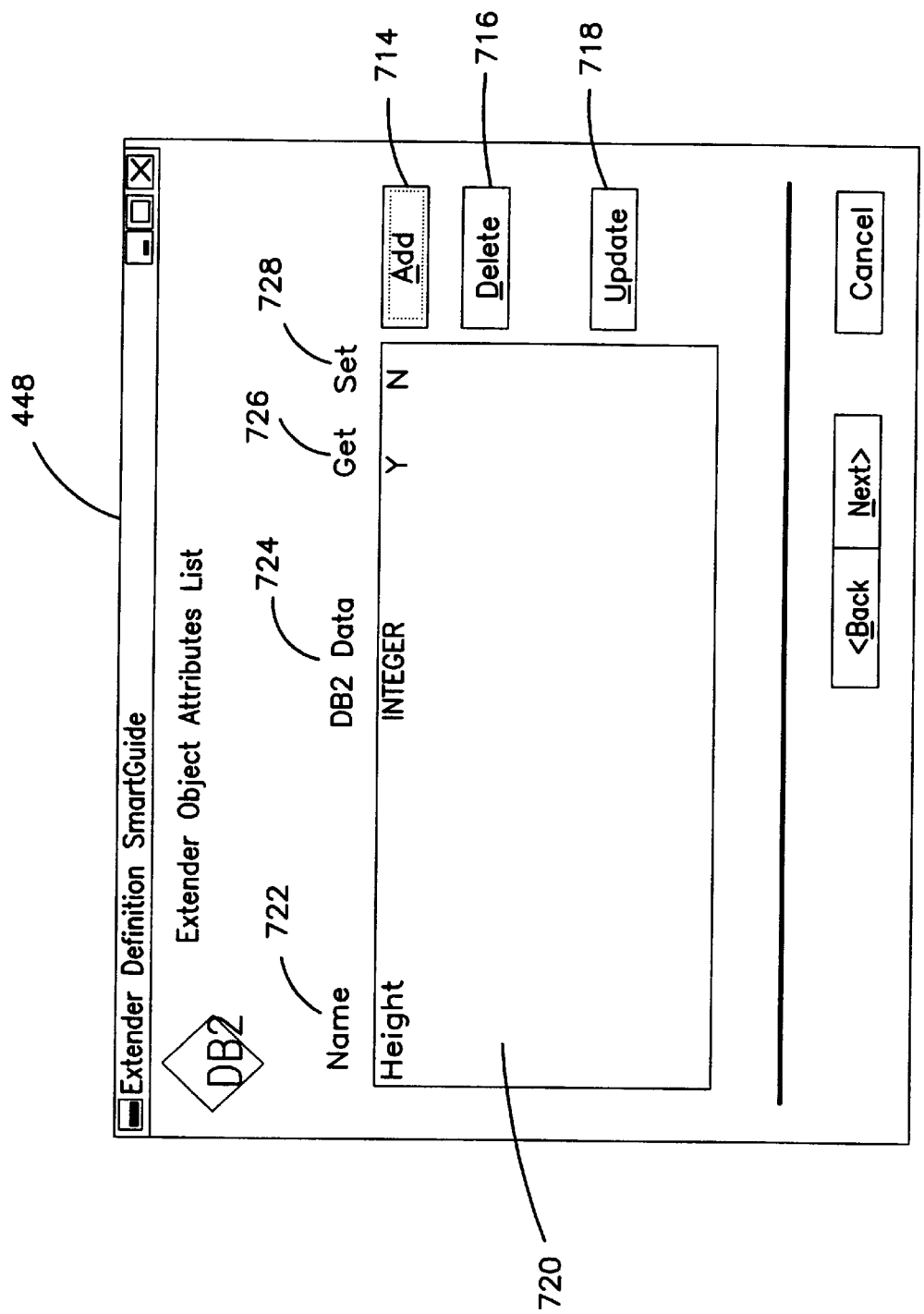

FIG. 7C illustrates a smart guide window 448 that is used to obtain attribute information for the extender object that is being created. This smart guide window 448 includes an add button 714 for adding attributes, a delete button 716 for deleting attributes, and an update button 718 for updating attributes. The list box 720 contains a list of attributes. Each row in the list box 720 contains a name column 722, a DB2 data column 724, a get column 726, and a set column 728, which provide information about each attribute in the list box 720. When the add button 714 or the update button 718 are selected, the next smart guide window 448 displayed enables defining attributes.

Figure 7D:
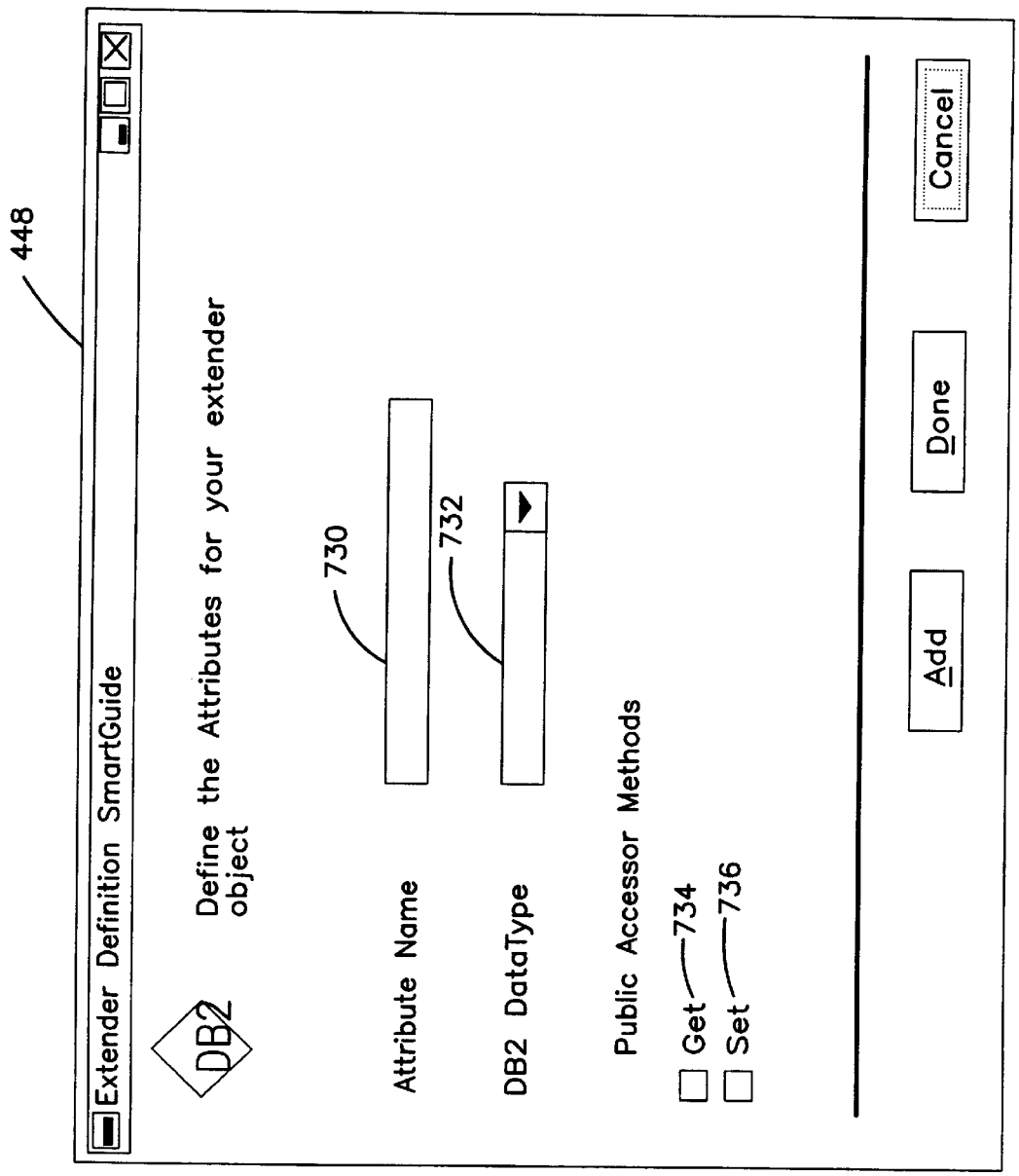

FIG. 7D illustrates the smart guide window 448 used to define attributes. An attribute name text box 730 enables entry or update of an attribute name. A DB2 data type text box 732 enables selection of a data type from a drop down list box. The get checkbox 734 and the set checkbox 736 enable selection of get and set. Once attributes have been defined for the extender object, the next smart guide window 448 enables defining methods for the extender object.

Figure 7E:
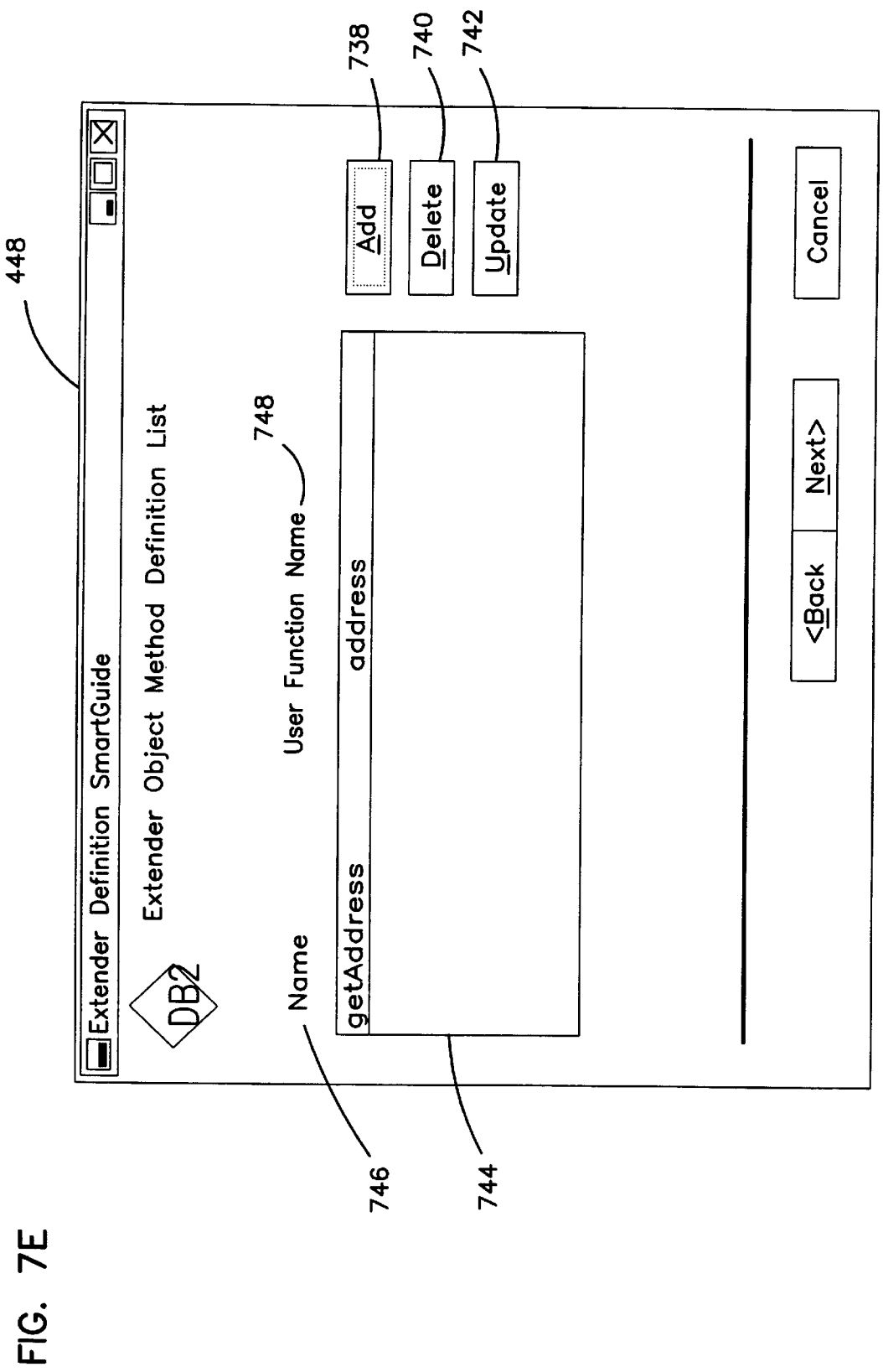

FIG. 7E illustrates a smart guide window 448 that is used to obtain a method definition list for the extender object that is being created. This smart guide window 448 includes an add button 738 for adding methods, a delete button 740 for deleting methods, and an update button 742 for updating methods. The list box 744 contains a list of methods. Each row in the list box 744 contains a name column 746 for the method and a user function name column 748 for the user function name of the method. When the add button 738 or the update button 740 are selected, the next smart guide displayed enables defining methods.

Figure 7F:
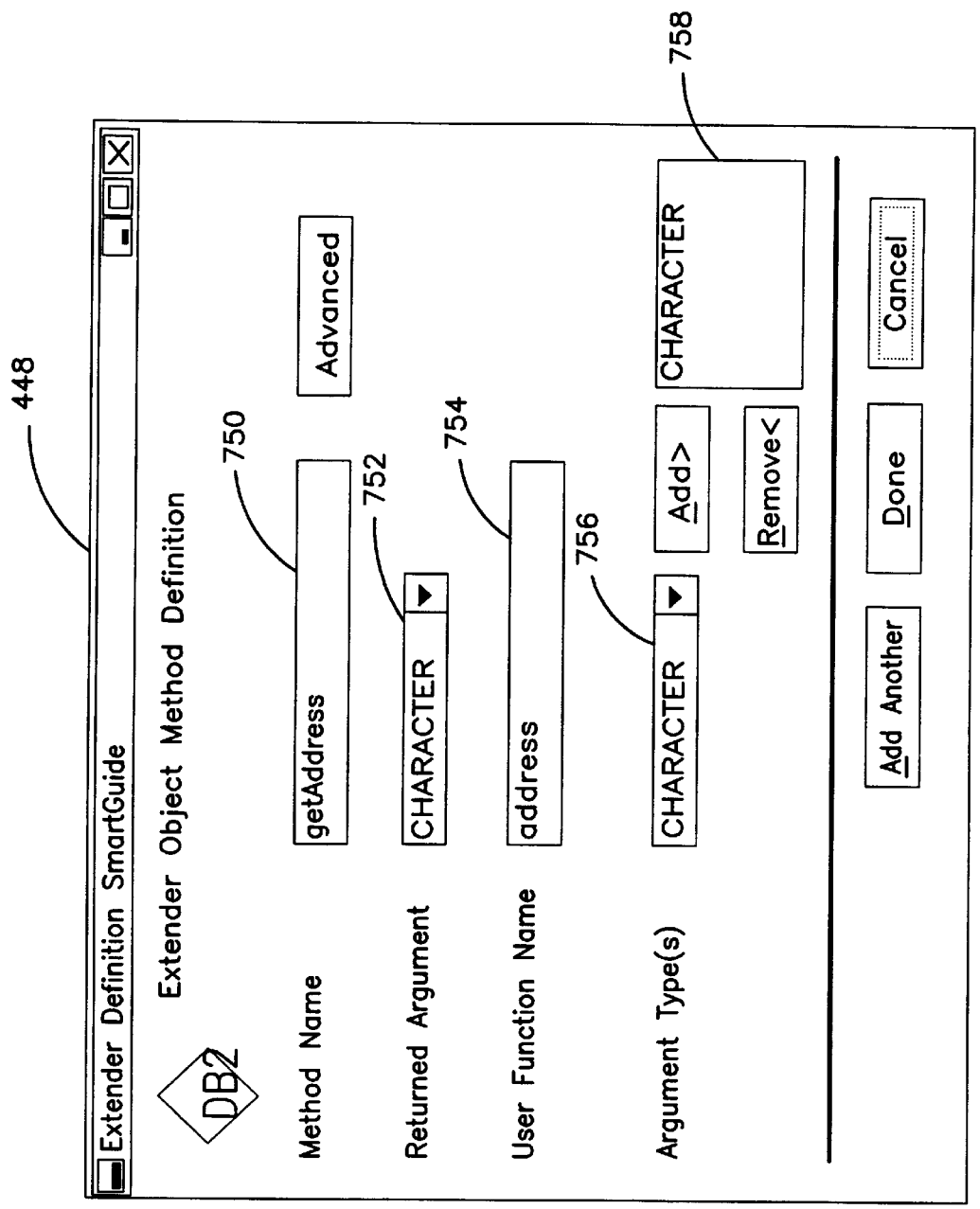

FIG. 7F illustrates the smart guide used to define methods. A method name text box 750 enables entry or update of a method name. A returned argument text box 752 enables selection of a data type from a drop down list box for the argument returned by the method. The user function name text box 754 enables entry of the user function name. The argument type text box 756 enables selection of one or more arguments for the method from a drop down list box. These arguments are displayed in list box 758. Once methods have been defined for the extender object, the next smart guide window 448 enables generation of extender project files.

Figure 7G:
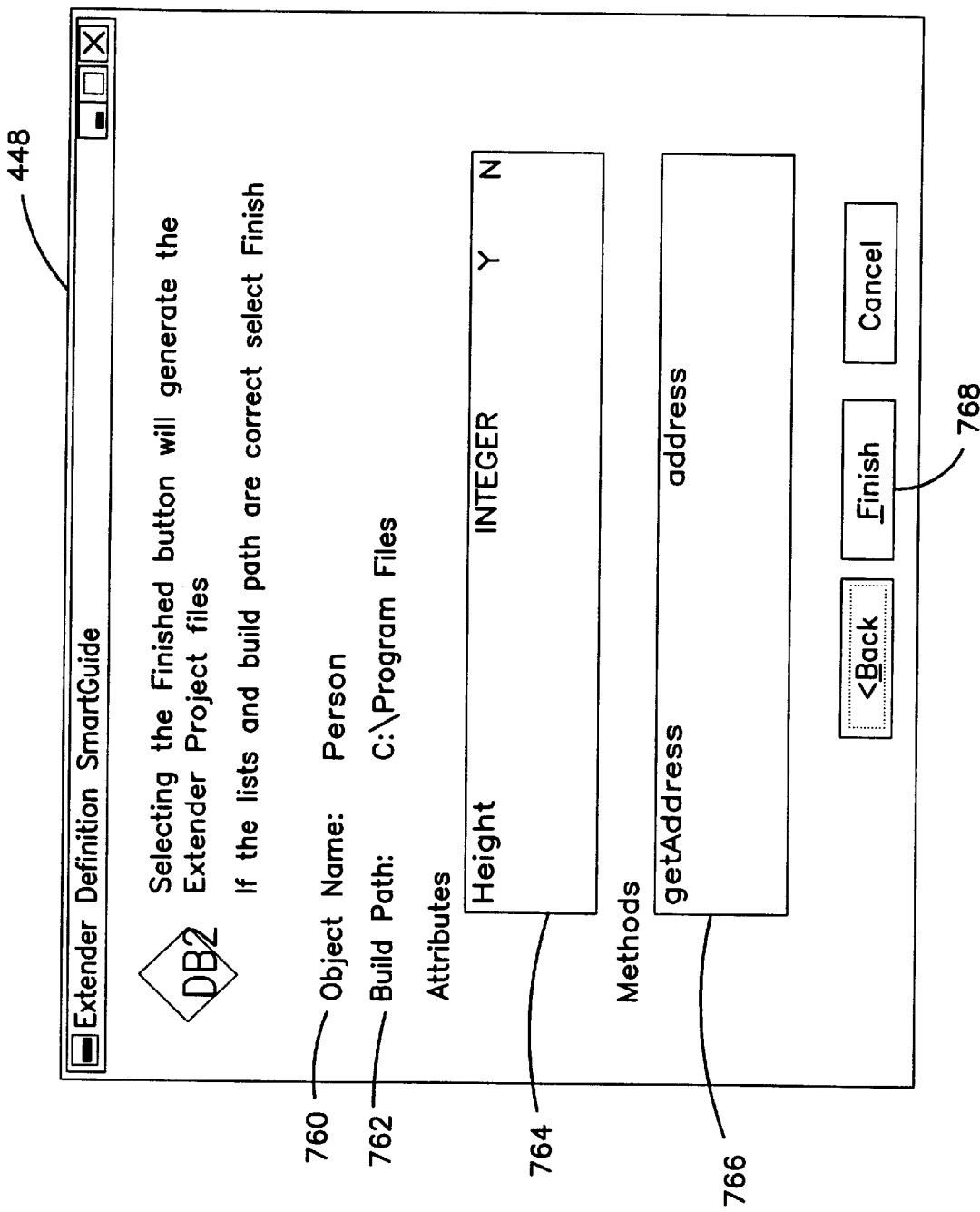

FIG. 7G illustrates a smart guide window 448 for generating extender project files. This smart guide window 448 displays the extender object name 760, a build path 762, an attributes list box 764 containing attributes, and a methods list box 766 containing methods. If the information provided by the smart guide is correct, a user selects the finish button 768, and then the extender smart guide 422 automatically generates the extender project files.

Figure 8:
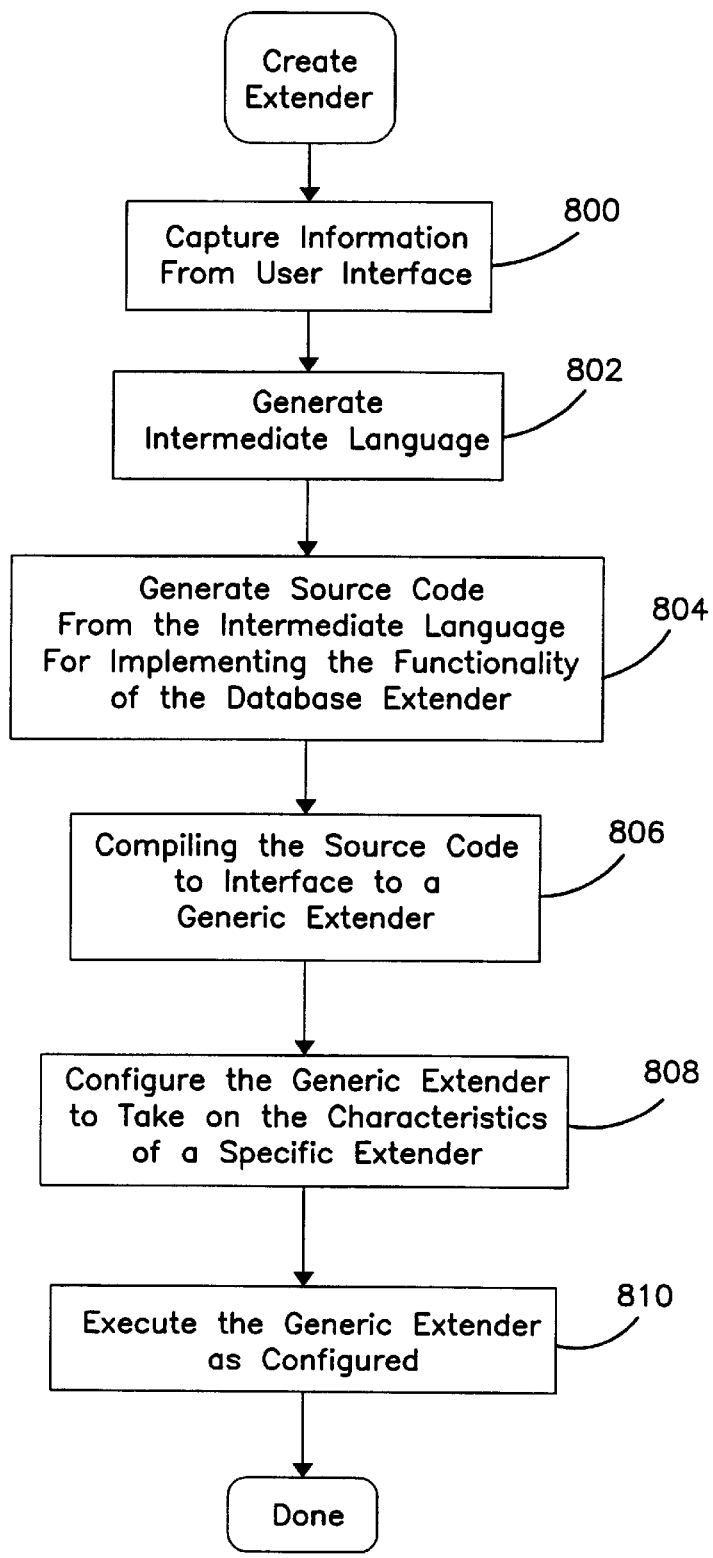
FIG. 8 is a flow chart that illustrates the general logic of the extender smart guide in performing the steps of the preferred embodiment of the invention to create an extender.

FIG. 8 is a flow chart that illustrates the general logic of the extender smart guide 422 in performing the steps of the preferred embodiment of the invention to create an extender.

Block 800 represents the extender smart guide 422 capturing information from the user interface.

Block 802 represents the extender smart guide 422 generating an intermediate language corresponding to the captured information.

Block 804 represents the extender smart guide 422 generating source code from the intermediate language for implementing the functionality of the database extender. The source code includes user-defined functions for a specific extender, administrative application programming interfaces for enabling and manipulating the specific extender, and an administrative command program that uses the administrative application programming interfaces.

Block 806 represents the extender smart guide 422 compiling the source code to interface to a generic extender.

Block 808 represents the extender smart guide 422 configuring the generic extender to take on the characteristics of a specific extender.

Block 810 illustrates the extender smart guide 422 executing the generic extender as configured to access and maintain the relational integrity of the specific extender.

In an alternative embodiment, the RDBMS 126 can execute a dynamic link library associated with the specific extender, and then the dynamic link library executes the generic extender. In yet another alternative embodiment, a client browser 102 invokes the specific extender, which in turn invokes the generic extender, which in turn invokes the RDBMS 126.

The programming logic generated by the extender smart guide 422 is divided into two sets of generated code. The first set of generated code includes administrative functions and stored procedures which will be run by the RDBMS 126 to enable a database table to include a column for an extender. This first set of generated code includes defining UDTs and UDFs to the database as well as building the administrative support tables and triggers. The second set of generated code includes boilerplate portions of the UDFs. This second set of generated code contains calls to user supplied modules which contain the actual UDF logic.

The user interface, generator, and the generic extender can be packaged together into a distribution package, however, one skilled in the art would recognize that they can be packaged in other ways.

Additionally, if a user wants to change an extender smart guide interface, the user is able to restart a session with the extender definition originally entered, make modifications, and then the extender smart guide will automatically regenerate the appropriate code.

Extender Window

The development computer 400 also includes an extender 424 which displays an extender window 446 on the monitor 434. The extender window 446 displays a project view of the extender 424 and allows the definition of attributes and access methods for database extender objects. By providing this project view, the extender 424 allows a developer to build extenders, but the extender 424 hides the internal mechanisms from the developer.

Figure 9:
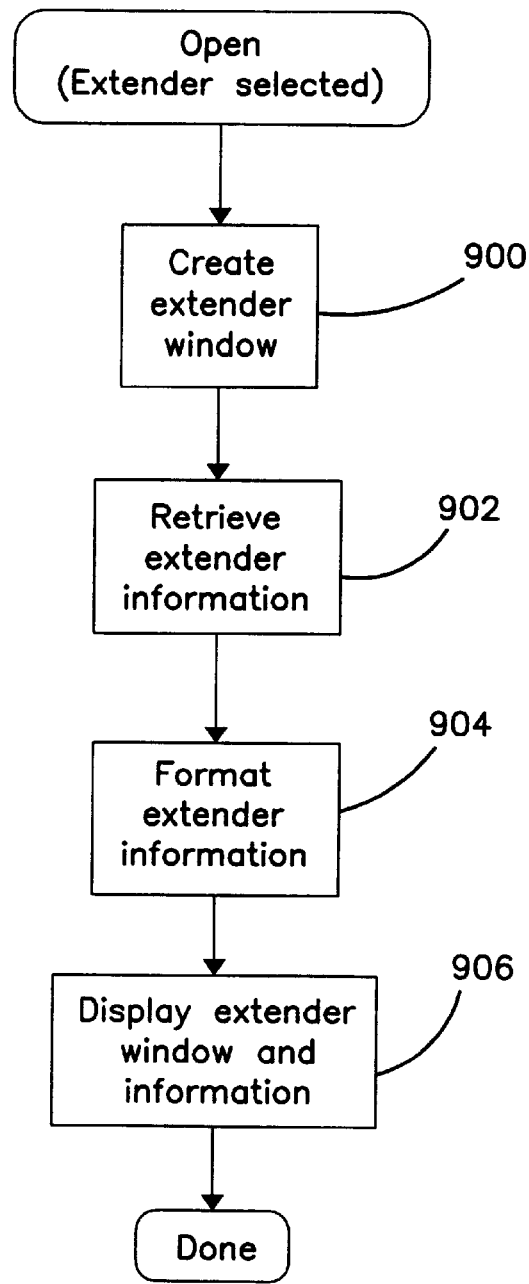
FIG. 9 is a flow chart that illustrates the general logic for an open (extender selected) routine.

FIG. 9 illustrates operations that may be performed by the development computer 400 when an extender 424 is selected as part of the preferred embodiment of the invention. In FIG. 9, the header block thereof indicates the particular input event with the current state denoted in parentheses. For FIG. 9, a corresponding diagram, i.e., FIG. 10, is provided to illustrate the operation of the routine.

FIG. 9 is a flow chart that illustrates the general logic for an open (extender selected) routine. FIG. 10 is a diagram of a computer generated display illustrating the operation of the routine of FIG. 9. The open routine opens or creates an extender window 446 to enable a user to define attributes and access methods for database extender objects.

Figure 10:
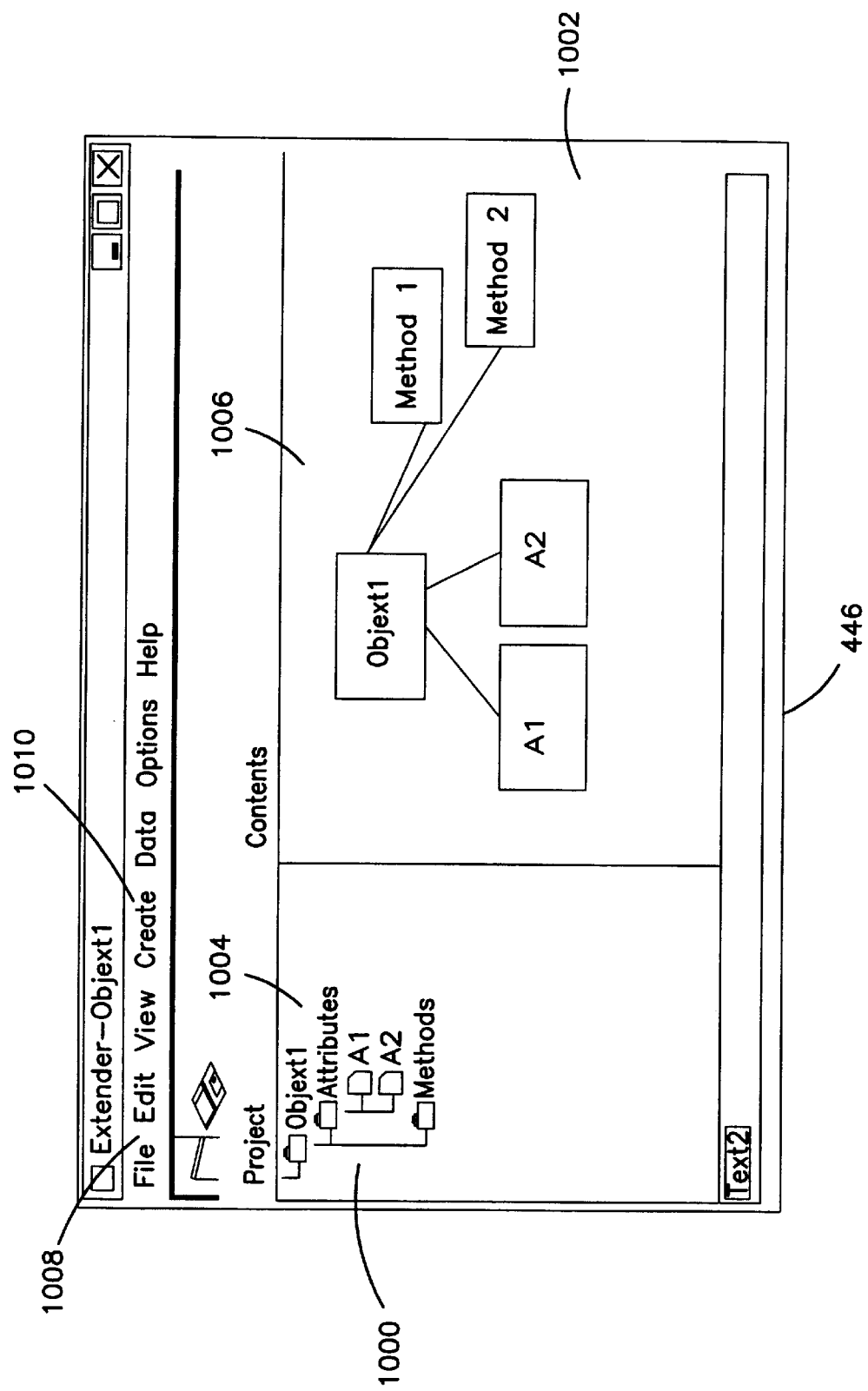
FIG. 10 is a diagram of a computer generated display illustrating the operation of the general logic for an open (extender selected) routine.

The extender window 446 is illustrative of a typical graphical user interface (GUI) window, and includes several standard user interface mechanisms, such as that displayed in FIG. 10, including a title bar (for repositioning), a border (for resizing), a minimize button, a maximize button, and a close button, and may also have scroll bars (for scrolling).

In the preferred embodiment, the open routine is executed whenever an "open" event (e.g., a double-clicked mouse button) is recorded after an extender has been selected. Selection of an extender may be made in several known manners, e.g., by using various mouse/keyboard combinations to select or highlight the extender represented visually on monitor 434. The act of opening or creating an extender may be initiated by other functions, e.g., selecting the function in a fixed or pop-up menu.

Block 900 represents the development computer 400 creating the extender window 446. The extender window 446 includes typical user interface mechanisms, such as those displayed in FIG. 10. A contents area is defined within the extender window 446.

Block 902 represents the development computer 400 retrieving the extender information from an APP file stored in a data storage device connected (either locally or remotely) to the development computer 400.

Block 904 represents the development computer 400 formatting the retrieved extender information for display within the contents area of the extender window 446.

Block 906 represents the development computer 400 displaying the extender window 446 and the formatted extender information on a monitor 434, as shown in FIG. 4. Opening or creation of the extender window 446 is then complete.

Once an extender window 446 is created and displayed, various operations are preferably provided to manipulate the extender window 446 and its contents, as is well known in the art.

FIG. 10 illustrates a relational database extender 424 displayed within the extender window 446. The relational database extender 424 has multiple extender objects. The display includes a project area 1000 and a contents area 1002. The project area 1000 provides a directory structure 1004 extender objects at the highest level, with attributes and methods of each object at lower levels. The contents area 1002 displays an object view 1006 of the extender objects and their attributes and methods.

The extender objects include UDTs and UDFs. These can also be displayed in the extender window 446. Additional UDTs and UDFs can be added to the extender 424. Moreover, a subclass can be invoked to build a new extender 424 from a displayed extender 424. Also, extender object attribute and method definitions can be modified. A menu bar 1008 may be provided to enable each of these actions to be taken. For example, by selecting the create menu 1010, an extender object can be created.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a programming development environment that supports the development of Internet and Intranet applications. In particular, a database extender can be created using smart guides. Initially, information from a user interface is captured. An intermediate language is then generated corresponding to the captured information. A source code is generated from the generated intermediate language. The source code implements the functionality of the database extender by interfacing to a generic extender. The interfaced generic extender is configured to take on the characteristics of the specific extender defined in the intermediate language. Then, the configured generic extender is executed as configured to access and maintain the relational integrity of the specific extender.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for creating a database extender comprising the steps of:

providing guides for creating the database extender, wherein each guide is a graphical user interface for obtaining user input to create the database extender;

using the provided guides to capture information from the user, wherein capturing information comprises obtaining an object name, a project directory, a name prefix, attribute information, and a method definition;

using the captured information to generate a specific extender by generating a source code from the captured information, wherein the source code implements the functionality of the specific extender, and wherein the source code has an administrative application programming interface for manipulating the specific extender, and an administrative command program that uses the administrative application programming interface;

configuring a generic extender to take on both the data type and functional characteristics of the specific extender;

executing the configured generic extender to access a database; and after executing the configured generic extender, executing administrative functions and stored procedures under the control of the database.

2. The method of claim 1 above, wherein an extender guide performs the steps of generating, further comprising the step of packaging the guides, the extender guide, and the generic extender into a distribution package.

3. The method of claim 1 above, wherein the source code includes user-defined functions for a specific extender, administrative application programming interfaces for enabling and manipulating the specific extender, and an administrative command program that uses the administrative application programming interfaces.

4. The method of claim 3 above, further comprising the step of compiling the source code to interface to the generic extender.

5. The method of claim 1 above, wherein a dynamic link library is associated with the specific extender, wherein a relational database management system executes the dynamic link library, and wherein the dynamic link library executes the generic extender.

6. The method of claim 1 above, wherein a client application invokes the specific extender, wherein the specific extender invokes the generic extender, and wherein the generic extender invokes the relational database management system.

7. An apparatus for creating a database extender, comprising:

a computer having a memory and a data storage device coupled thereto, wherein the data storage device stores a relational database;

one or more computer programs, performed by the computer, for providing guides for creating the database extender, wherein each guide is a graphical user interface for obtaining user input to create the database extender, using the provided guides to capture information from the user, wherein capturing information comprises obtaining an object name, a project directory, a name prefix, attribute information, and a method definition, using the captured information to generate a specific extender by generating a source code from the captured information, wherein the source code implements the functionality of the specific extender, and wherein the source code has an administrative application programming interface for manipulating the specific extender, and an administrative command program that uses the administrative application programming interface, configuring a generic extender to take on both the data type and functional characteristics of the specific extender, executing the configured generic extender to access a database, and after executing the configured generic extender, executing administrative functions and stored procedures under the control of the database.

8. The apparatus of claim 7 above, wherein an extender smart guide provides the means for generating, further comprising the means for packaging the guides, the extender smart guide, and the generic extender into a distribution package.

9. The apparatus of claim 7 above, wherein the source code includes user-defined functions for a specific extender, administrative application programming interfaces for enabling and manipulating the specific extender, and an administrative command program that uses the administrative application programming interfaces.

10. The apparatus of claim 9 above, further comprising the means for compiling the source code to interface to the generic extender.

11. The apparatus of claim 7 above, wherein a dynamic link library is associated with the specific extender, wherein a relational database management system executes the dynamic link library, and wherein the dynamic link library executes the generic extender.

12. The apparatus of claim 7 above, wherein a client application invokes the specific extender, wherein the specific extender invokes the generic extender, and wherein the generic extender invokes the relational database management system.

13. An article of manufacture comprising a program storage medium readable by a computer and embodying one or more instructions executable by the computer to perform method steps for creating a database extender, the database extender being created by the computer to retrieve data from a database stored in an data storage device coupled to the computer, the method comprising the steps of;

providing guides for creating the database extender, wherein each guide is a graphical user interface for obtaining user input to create the database extender;

using the provided guides to capture information from the user, wherein capturing information comprises obtaining an object name, a project directory, a name prefix, attribute information, and a method definition;

using the captured information to generate a specific extender by generating a source code from the captured information, wherein the source code implements the functionality of the specific extender, and wherein the source code has an administrative application programming interface for manipulating the specific extender, and an administrative command program that uses the administrative application programming interface;

configuring a generic extender to take on both the data types and functional characteristics of the specific extender;

executing the configured generic extender to access a database; and after executing the configured generic extender, executing administrative functions and stored procedures under the control of the database.

14. The method of claim 13 above, wherein an extender guide performs the steps of generating, further comprising the step of packaging the guides, the extender guide, and the generic extender into a distribution package.

15. The method of claim 13 above, wherein the source code includes user-defined functions for a specific extender, administrative application programming interfaces for enabling and manipulating the specific extender, and an administrative command program that uses the administrative application programming interfaces.

16. The method of claim 15 above, further comprising the step of compiling the source code to interface to the generic extender.

17. The method of claim 13 above, wherein a dynamic link library is associated with the specific extender, wherein a relational database management system executes the dynamic link library, and wherein the dynamic link library executes the generic extender.

18. The method of claim 13 above, wherein a client application invokes the specific extender, wherein the specific extender invokes the generic extender, and wherein the generic extender invokes the relational database management system.

19. The method of claim 1 above, wherein after generating a specific extender, further comprising the steps of:

providing multiple guides for modifying the specific extender, wherein each guide is a graphical user interface for obtaining user input to modify the specific extender;

capturing information from the graphical user interface in response to user input; and using the captured information to modify the specific extender.

20. The apparatus of claim 7 above, wherein after generating a specific extender, further comprising:

means for providing multiple guides for modifying the specific extender, wherein each guide is a graphical user interface for obtaining user input to modify the specific extender;

means for capturing information from the graphical user interface in response to user input; and means for using the captured information to modify the specific extender.

21. The article of manufacture of claim 13, wherein after generating a specific extender, further comprising the steps of:

providing multiple guides for modifying the specific extender, wherein each guide is a graphical user interface for obtaining user input to modify the specific extender;

capturing information from the graphical user interface in response to user input; and using the captured information to modify the specific extender.

* * * * *